(12) United States Patent
Tillotson et al.

(10) Patent No.: US 10,981,645 B2
(45) Date of Patent: Apr. 20, 2021

(54) DRAG REDUCTION SYSTEMS FOR AIRCRAFT

(71) Applicant: THE BOEING COMPANY, Chicago, IL (US)

(72) Inventors: Brian Tillotson, Kent, WA (US); William Pflug, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 265 days.

(21) Appl. No.: 16/201,040

(22) Filed: Nov. 27, 2018

(65) Prior Publication Data

US 2020/0164967 A1 May 28, 2020

(51) Int. Cl.
*B64C 23/06* (2006.01)
*B64C 5/06* (2006.01)
*B64C 5/02* (2006.01)

(52) U.S. Cl.
CPC ............... *B64C 23/06* (2013.01); *B64C 5/02* (2013.01); *B64C 5/06* (2013.01)

(58) Field of Classification Search
CPC .............. B64C 23/06; B64C 5/02; B64C 5/06
See application file for complete search history.

(56) References Cited

U.S. PATENT DOCUMENTS

| 2,740,596 | A | * | 4/1956 | Lee | ................. B64C 23/06 244/204.1 |
| 4,739,957 | A | * | 4/1988 | Vess | ................. B64C 9/34 244/199.1 |
| 6,095,459 | A | * | 8/2000 | Godina | ............ B64C 9/32 244/213 |
| 8,979,018 | B2 | | 3/2015 | Pflug | |
| 9,522,727 | B2 | | 12/2016 | Pflug | |
| 2012/0091266 | A1 | * | 4/2012 | Whalen | ........... B64C 23/005 244/87 |
| 2015/0329200 | A1 | * | 11/2015 | Barrett | ............ G03G 13/26 244/200.1 |

* cited by examiner

*Primary Examiner* — Richard R. Green
*Assistant Examiner* — William L Gmoser
(74) *Attorney, Agent, or Firm* — The Small Patent Law Group LLC; Joseph M. Butscher

(57) ABSTRACT

Drag reduction systems and methods for an aircraft include a first vortex generator position on a portion of the aircraft, and a second vortex generator positioned on the portion of the aircraft. The first vortex generator is associated with the second vortex generator. The first vortex generator is asymmetrical to the second vortex generator in relation to a coupling axis in order to offset the longitudinal contribution of the vortex generator to vehicle cross-sectional area.

20 Claims, 4 Drawing Sheets

DRAG REDUCTION SYSTEMS FOR AIRCRAFT

FIELD OF THE DISCLOSURE

Examples of the present disclosure generally relate drag reduction systems and methods for aircraft, and more particularly to systems and methods of reducing a drag effect of vortex generators of an aircraft.

BACKGROUND OF THE DISCLOSURE

Certain aircraft include vortex generators. For example, a vertical stabilizer of an aircraft may include a pair of vortex generators. One of the vortex generators is on a starboard side of the vertical stabilizer, and the other of the vortex generators is on a port side of the vertical stabilizer.

A vortex generator typically is or includes a panel, vane, fine, or the like. When an aircraft is in flight, the vortex generator creates a vortex that removes at least a portion of a slow-moving boundary layer in contact with the surface of the aircraft, and delays local flow separation and aerodynamic stalling, thereby improving control of the aircraft.

In general, transonic aircraft incur wave drag wherever the cross-sectional area of the aircraft abruptly changes. Vortex generators, including those on the vertical tail or horizontal stabilizer of some aircraft, cause a small, but non-zero contribution to such wave drag.

Typically, vortex generators are mounted on a skin of a vertical tail, horizontal stabilizer, or wing over a main spar. Vortex generators are generally paired, such that one vortex generator is symmetrical to another vortex generator in relation to an axis. For example, on a vertical stabilizer, one vortex generator is positioned on a port side of the vertical stabilizer, and another vortex generator is positioned on a starboard side of the vertical stabilizer, with the vortex generators being symmetrical to one another in relation to a root of the vertical stabilizer.

One strategy to eliminate drag caused by vortex generators is to refrain from positioning vortex generators on an aircraft. However, vortex generators are used for a reason, such as yaw control during takeoff. Therefore, eliminating vortex generators when needed may require designing and installing a larger vertical tail, rudder, horizontal stabilizer, or elevator.

As another strategy, selectively deployable vortex generators may be used, which eliminate drag via retraction of the vortex generators at cruising speeds, for example. However, selectively deployable vortex generators are typically heavier and more costly than standard, static vortex generators.

SUMMARY OF THE DISCLOSURE

A need exists for a system and method of reducing a drag effect of vortex generators on an aircraft. Further, a need exists for an efficient, low cost system and method of reducing a drag effect of vortex generators.

With those needs in mind, certain examples of the present disclosure provide a drag reduction system for an aircraft. The drag reduction system includes a first vortex generator positioned on a portion of the aircraft, and a second vortex generator positioned on the portion of the aircraft. The first vortex generator is associated with the second vortex generator. The first vortex generator and the second vortex generator are asymmetrical to one another in relation to a coupling axis.

In at least one example, the portion of the aircraft includes a vertical stabilizer. For example, the first vortex generator may extend from one of a port side or a starboard side of the vertical stabilizer, the second vortex generator may extend from the other of the port side or the starboard side of the vertical stabilizer, and a root of the vertical stabilizer may include the coupling axis.

In at least one example, the coupling axis is longitudinally aligned with a center line of the aircraft. In at least one other example, the coupling axis may be offset from and parallel with a center line of the aircraft.

The first vortex generator and the second vortex generator may be proximate to a common fuselage station of the aircraft, such as when the first vortex generator and the second vortex generator are at different angles and/or have different lengths.

A first angle at which the first vortex generator is oriented in relation to the coupling axis may differ from a second angle at which the second vortex generator is oriented in relation to the coupling axis. A first length of the first vortex generator may differ from a second length of the second vortex generator.

The first vortex generator may be longitudinally offset from the second vortex generator. For example, a portion of the first vortex generator may be further fore or aft than at least a corresponding portion of the second vortex generator. In at least one example, a leading edge of one of the first vortex generator or the second vortex generator is longitudinally aligned with an intermediate portion of the other of the first vortex generator or the second vortex generator. The first vortex generator may also be laterally offset a different distance from the coupling axis than the second vortex generator. For example, a first spanwise distance to the coupling axis of a portion of the first vortex generator may differ from a second spanwise distance to the coupling axis of a corresponding portion of the second vortex generator.

In at least one example, an asymmetry between the first vortex generator and the second vortex generator in relation to the coupling axis is formed by two or more of the following: a first angle at which the first vortex generator is oriented in relation to the coupling axis differing from a second angle at which the second vortex generator is oriented in relation to the coupling axis, a first length of the first vortex generator differing from a second length of the second vortex generator, the first vortex generator being laterally offset from the coupling axis in relation to the second vortex generator, and/or the first vortex generator being longitudinally offset from the second vortex generator.

In at least one example, a first angle at which the first vortex generator is oriented in relation to the coupling axis differs from a second angle at which the second vortex generator is oriented in relation to the coupling axis, a first length of the first vortex generator differs from a second length of the second vortex generator, the first vortex generator is laterally offset from the coupling axis in relation to the second vortex generator, and the first vortex generator is longitudinally offset from the second vortex generator.

Certain examples of the present disclosure provide a drag reduction method for an aircraft. The drag reduction method includes providing a first vortex generator on a portion of the aircraft, providing a second vortex generator that is associated with the first vortex generator on the portion of the aircraft, and forming an asymmetry between the first vortex generator and the second vortex generator in relation to a coupling axis.

The forming the asymmetry may include one or more of: orienting the first vortex generator at a first angle in relation to the coupling axis that differs from a second angle at which the second vortex generator is oriented in relation to the coupling axis, differing a first length of the first vortex generator from a second length of the second vortex generator, laterally offsetting the first vortex generator from the coupling axis in relation to the second vortex generator, and/or longitudinally offsetting the first vortex generator from the second vortex generator.

DETAILED DESCRIPTION OF THE DISCLOSURE

Figure 1:
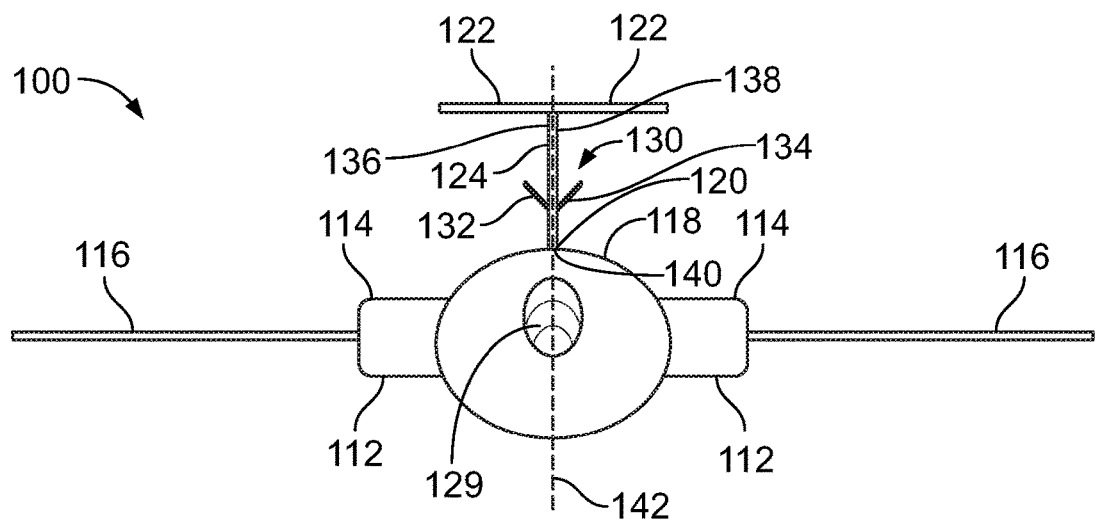
FIG. 1 illustrates a front view of an aircraft, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition may include additional elements not having that condition.

Certain examples of the present disclosure provide a drag reduction system for an aircraft that includes a first vortex generator on a portion of an aircraft and a second vortex generator on the portion of the aircraft. The first vortex generator is associated with the second vortex generator. The first vortex generator and the second vortex generators are coupled together in relation to a coupling axis. The first vortex generator and the second vortex generator are asymmetrical to one another in relation to the coupling axis.

In at least one example, the first and second vortex generators are asymmetrical between left and right sides (or port and starboard sides) of an aircraft. The first vortex generator may be positioned on a port side of a vertical stabilizer, while the second vortex generator may be positioned on a starboard side of the vertical stabilizer. The first and second vortex generators may be longitudinally offset in relation to one another, thereby causing an asymmetry between the first and second vortex generators, such as in relation to a root of the vertical stabilizer, which may be or otherwise include the coupling axis. In at least one example, additionally, the first vortex generator may be closer to the root of the vertical stabilizer than the second vortex generator, or vice versa.

The first vortex generator and the second vortex generator are associated with one another, but may be offset in relation to each other along a spar of the aircraft. In at least one example, the trailing edge of the first vortex generator is aligned with a leading edge of the second vortex generator, or vice versa.

It has been found that the asymmetric relationship between the first vortex generator and the second vortex generator reduces the drag effect that would otherwise be caused by symmetrical vortex generators. For example, a trailing edge of a starboard vortex generator is aligned with a leading edge of a port vortex generator. As such, the cross-section due to the vortex generators has a smaller rise at the starboard leading edge, no change where the starboard trailing edge lines up with the port leading edge, and a smaller drop at the trailing edge of the port vortex generator, thereby reducing wave drag for the aircraft. Positioning asymmetrically-coupled vortex generators does not increase costs or add design complexity, in contrast to use of deployable vortex generators.

Certain examples of the present disclosure provide a method of enhancing aerodynamics of an aircraft that includes using first and second coupled vortex generators to improve performance at low speeds, and positioning the first and second coupled vortex generators to be asymmetrical in relation to a coupling axis to minimize wave drag, such as at high speeds.

Figure 2:
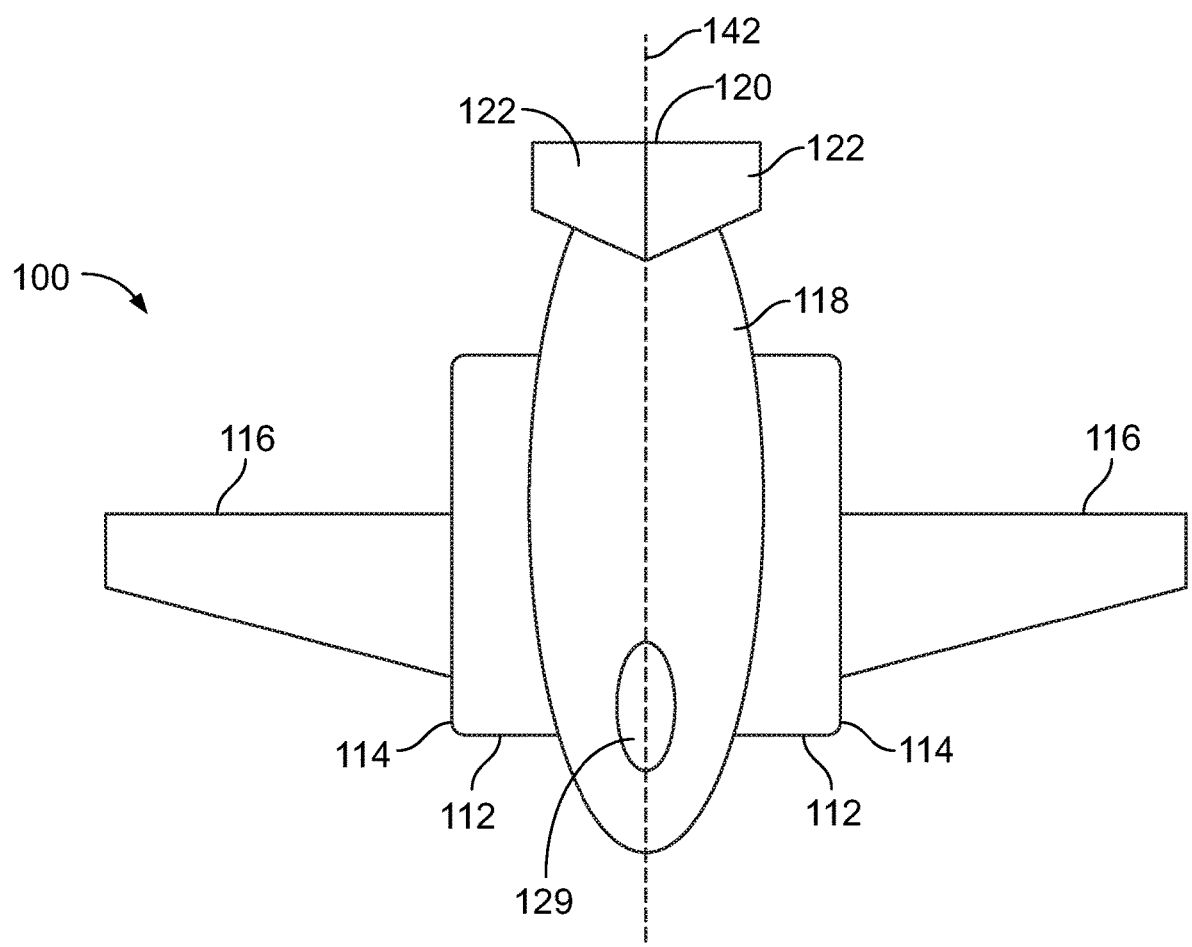
FIG. 2 illustrates a top view of the aircraft of FIG. 1.

FIG. 1 illustrates a front view of an aircraft 100, according to an example of the present disclosure. FIG. 2 illustrates a top view of the aircraft 100 of FIG. 1. Referring to FIGS. 1 and 2, the aircraft 100 includes a propulsion system 112 that may include two turbofan engines 114, for example. Optionally, the propulsion system 112 may include more engines 114 than shown. The engines 114 are carried by wings 116 and/or a fuselage 118 of the aircraft 100. In other examples, the engines 114 may be carried by an empennage 120. The empennage 120 may also support horizontal stabilizers 122 and a vertical stabilizer 124. The fuselage 118 of the aircraft 100 defines an internal cabin, which may include a cockpit 129. The aircraft 100 may be sized, shaped, and configured other than shown in FIG. 1.

A pair 130 of first and second vortex generators 132 and 134 is positioned on a portion of the aircraft 100. For example, the first vortex generator 132 may outwardly extend from a starboard (right) side 136 of the vertical stabilizer 124, and the second vortex generator 134 may outwardly extend from a port (left) side 138 of the vertical stabilizer 124. Optionally, the first vortex generator 132 may outwardly extend from the port side 138, and the second vortex generator 134 may outwardly extend from the starboard side 136.

The first vortex generator 132 and the second vortex generator 134 are associated with one another. The first vortex generator 132 and the second vortex generator 134 are coupled together in relation to a coupling axis. For example, the vertical stabilizer 124 extends from the fuselage 118 (or another portion of the aircraft 100) at a root 140. In at least one example, the root 140 is or otherwise includes the coupling axis. As explained herein, the first vortex generator 132 and the second vortex generator 134 are asymmetrical to one another with respect to the coupling axis, such as the root 140.

As shown in FIGS. 1 and 2, the root 140 may be longitudinally aligned with a center line 142 of the aircraft 100. That is, the root 140 may be parallel with the center line 142. In at least one example, the coupling axis, such as the root 140, is longitudinally aligned with the center line 142. That is, the coupling axis is parallel with the center line 142. In a least one example, the coupling axis may be coaxial with the center line 142. In at least one example, the coupling axis may be offset from the center line 142. For example, the coupling axis may be offset from, and parallel with, the center line 142.

Each of the first vortex generator 132 and the second vortex generator 134 may be a panel, fin, and/or vane extending from a surface of the aircraft 100. For example, the first vortex generator 132 and the second vortex generator 134 may be metal fins outwardly extending from surfaces of the aircraft 100.

As shown, the first vortex generator 132 and the second vortex generator 134 may be positioned on the vertical stabilizer 124. Optionally, the first vortex generator 132 and the second vortex generator 134 may be positioned on various other surfaces of the aircraft 100, such as upper or lower portions of the wings 116, the horizontal stabilizers 122, the fuselage 118, the engines 114, and/or the like. In at least one example, the first vortex generator 132 and the second vortex generator 134 of the pair 130 may be proximate to a fuselage station of the aircraft 100. That is, the first vortex generator 132 and the second vortex generator 134 may be proximate to a common fuselage station of the aircraft 100. Further, the aircraft 100 may include more than one pair 130 of vortex generators 132 and 134.

Figure 3:
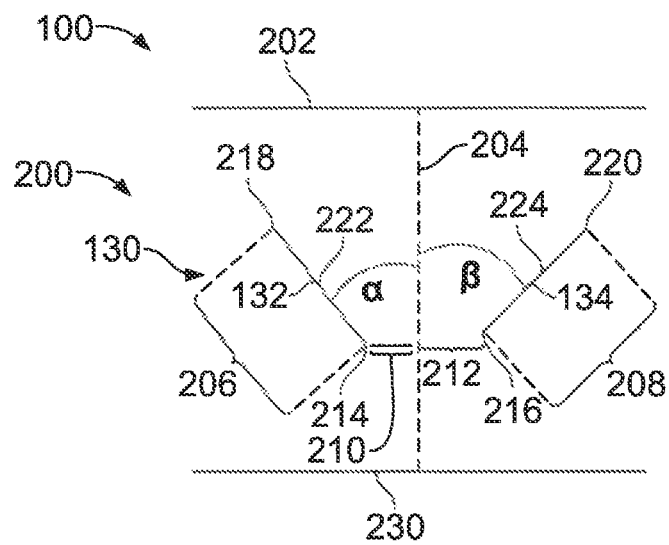
FIG. 3 illustrates a simplified view of a drag reduction system for the aircraft, according to an example of the present disclosure.

FIG. 3 illustrates a simplified view of a drag reduction system 200 for the aircraft 100, according to an example of the present disclosure. The drag reduction system 200 includes the first vortex generator 132 extending from a portion 202 of the aircraft 100, and the second vortex generator 134 extending from the portion 202 of the aircraft 100. As described above with respect to FIGS. 1 and 2, the portion 202 may be or otherwise include the vertical stabilizer 124. In at least one other example, the portion 202 may be or otherwise include one or both wings 116, one or both horizontal stabilizers 122, the fuselage 118, one or both engines 114, and/or the like.

The first vortex generator 132 is associated with the second vortex generator 134. In at least one example, the first vortex generator 132 and the second vortex generator 134 form the pair 130, which may be proximate to a fuselage station of the aircraft 100. The first vortex generator 132 and the second vortex generator 134 are coupled together in relation to a coupling axis 204. For example, when the first vortex generator 132 and the second vortex generator 134 are on the vertical stabilizer 124 (as shown in FIG. 1), the coupling axis 204 may be or include the root 140 of the vertical stabilizer 124. In at least one other example, the coupling axis 204 may be the center line 142 of the aircraft 100. In at least one other example, the coupling axis 204 is offset from, and parallel with, the center line 142 of the aircraft 100.

In order to reduce drag at higher speeds, the first vortex generator 132 and the second vortex generator 134 are asymmetrical to one another in relation to the coupling axis 204. For example, the asymmetry may be formed by a first angle α at which the first vortex generator 132 is oriented in relation to the coupling axis 204 differing from a second angle β at which the second vortex generator 134 is oriented in relation to the coupling axis 204. The angle α may be greater or less than the angle β.

In at least one example, a first length 206 of the first vortex generator 132 may differ from a second length 208 of the second vortex generator 134. The length 206 may be greater or less than the length 208. In at least one example, the first angle α differs from the second angle β, and the first length 206 differs from the second length 208. In at least one other example, the first angle α is equal to the second angle β, and the first length 206 differs from the second length 208. In at least one other example, the first angle α differs from the second angle β, and the first length 206 equals the second length 208.

In at least one example, a first spanwise distance 210 to the coupling axis 204 of a portion of the first vortex generator 132 may differ from a second spanwise distance 212 to the coupling axis 204 of a corresponding portion of the second vortex generator 134. A spanwise distance to the coupling axis 204 is a straight line distance that intersects the coupling axis 204 at a right angle. As such, the first vortex generator 132 and the second vortex generator 134 may be laterally offset from one another in relation to the coupling axis 204. The spanwise distances are straight lines that intersect the coupling axis 204 at right angles. As an example, the first spanwise distance 210 from a first leading edge 214 of the first cortex generator 132 may differ the second spanwise distance 212 from the second leading edge 216 of the second vortex generator 134. Optionally, the spanwise distances 210 and 212 may be from first and second trailing edges 218 and 220, first and second intermediate portions 222 and 224, or the like. The first spanwise distance 210 may be greater or less than the second spanwise distance 212.

In at least one example, the first angle α differs from (or is equal to) the second angle β, the first length 206 differs from (or is equal to) the second length 208, and the first spanwise distance 210 differs from the second spanwise distance 212. In at least one other example, the first spanwise distance 210 and the second spanwise distance 212 are equal, and the first angle α differs from the second angle β, and/or the first length 206 differs from the second length 208.

As another example of asymmetry, at least a portion of the first vortex generator 132 and a corresponding portion of the second vortex generator 134 may be at different longitudinal positions (that is, longitudinally offset) with respect to on another. For example, the first leading edge 214 (and/or the first trailing edge 218) of the first vortex generator 132 may be further fore or aft the second leading edge 216 (and/or the second trailing edge 220). As shown in FIG. 3, the first leading edge 214 of the first vortex generator 132 is longitudinally closer to a fore position 230 of the aircraft 100 than the second leading edge 216 of the second vortex generator 134. In at least one example, the second leading edge 216 of the second vortex generator 134 may be longitudinally aligned with the intermediate portion 222 of the first vortex generator 132 (that is, a straight line between the second leading edge 216 and the intermediate portion 222 intersects the coupling axis 204 at a right angle), or vice versa.

In at least one example, the first angle α differs from (or is equal to) the second angle β, the first length 206 differs from (or is equal to) the second length 208, the first spanwise distance 210 differs from (or is equal to) the second spanwise distance 212, and the first vortex generator 132 and the second vortex generator 134 are longitudinally offset from one another. In at least one other example, the first vortex generator 132 and the second vortex generator 134 are longitudinally aligned, and the first spanwise distance 210 differs from the second spanwise distance 212, the first angle α differs from the second angle β, and/or the first length 206 differs from the second length 208.

Figure 4:
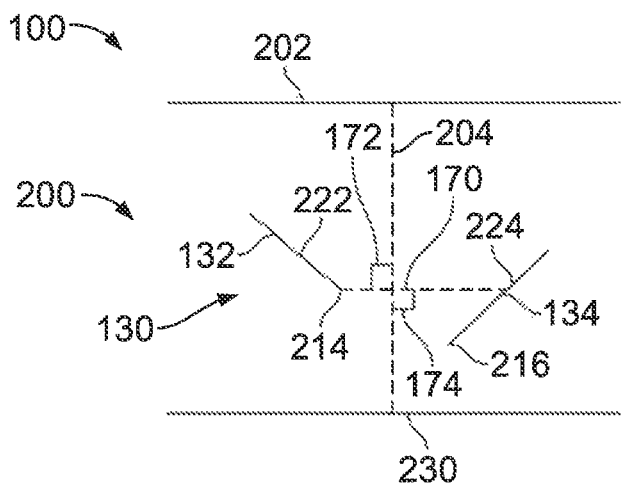
FIG. 4 illustrates a simplified view of a drag reduction system for the aircraft, according to an example of the present disclosure.

FIG. 4 illustrates a simplified view of the drag reduction system 200 for the aircraft 100, according to an example of the present disclosure. In this example, the first leading edge 214 of the first vortex generator 132 is longitudinally aligned with the second intermediate portion 224 of the second vortex generator 134. That is, a straight line 170 connecting the first leading edge 214 to the second intermediate portion 224 intersects the coupling axis at right angles 172 and 174. Optionally, the second leading edge 216 of the second vortex generator 134 may be longitudinally aligned with the first intermediate portion 222 of the first vortex generator 132.

Figure 5:
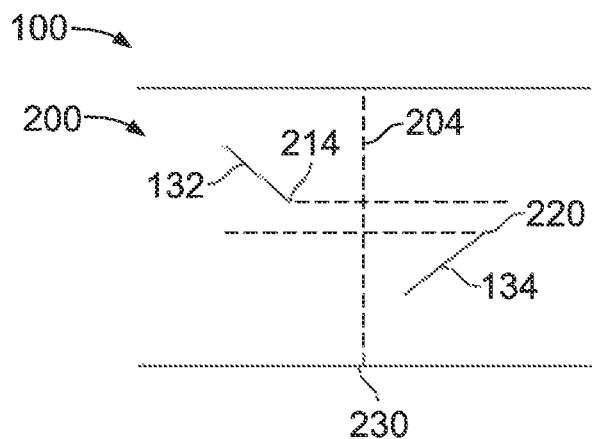
FIG. 5 illustrates a simplified view of a drag reduction system for the aircraft, according to an example of the present disclosure.

FIG. 5 illustrates a simplified view of the drag reduction system 200 for the aircraft 100, according to an example of the present disclosure. As shown in FIG. 5, the first vortex generator 132 and the second vortex generator 134 may be entirely longitudinally misaligned with one another. The second vortex generator 134 may be entirely closer to the fore position 230 than the first vortex generator 132, or vice versa. For example, the first leading edge 214 of the first vortex generator 132 may not be longitudinally aligned with second trailing edge 220 of the second vortex generator 134.

Figure 6:
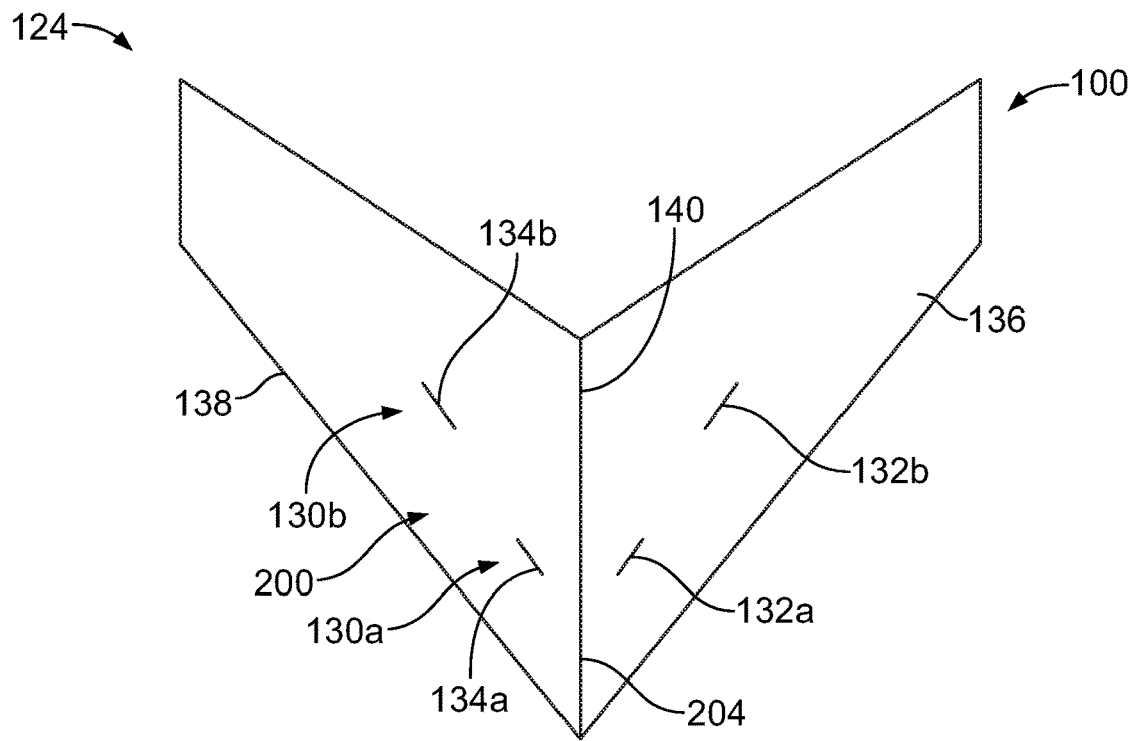
FIG. 6 illustrates a flattened view of a vertical stabilizer unfolded about a root, according to an example of the present disclosure.

FIG. 6 illustrates a flattened view of the vertical stabilizer 124 unfolded about the root 140, according to an example of the present disclosure. The drag reduction system 200 may be on the vertical stabilizer 124. The drag reduction system 200 includes a first pair 130a of a first vortex generator 132a and a second vortex generator 134a, and a second pair 130b of a first vortex generator 132b and a second vortex generator 134b. The root 140 forms or otherwise includes the coupling axis 204. The first vortex generators 132a and 132b may be on the starboard side 136, and the second vortex generators 134a and 134b may be on the port side 138, or vice versa. The first vortex generator 132a and the second vortex generator 132b are asymmetrical to one another with respect to the coupling axis 204 (in this case, the root 140), such as described with respect to any of the examples above. Similarly, the first vortex generator 132b and the second vortex generator 134b are asymmetrical to one another with respect to the coupling axis 204, such as described with respect to any of the examples above. The vertical stabilizer 124 (or any other portion of the aircraft 100) may include more pairs 130 than shown. In at least one example, the vertical stabilizer 124 (or any other portion of the aircraft 100) may include only one of the pairs 130a or 130b. In at least one example, none of the vortex generators 132a, 132b, 134a, or 134b are symmetrical with respect to any other vortex generator with respect to the coupling axis 204.

Figure 7:
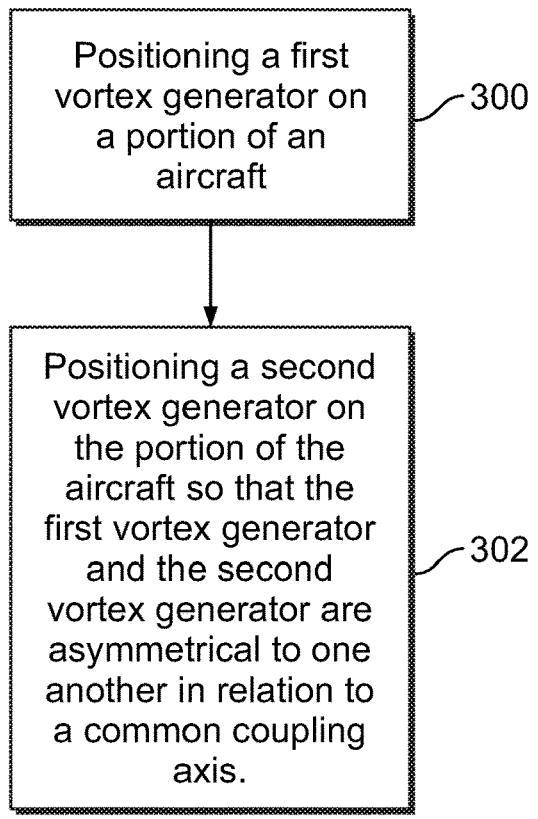
FIG. 7 illustrates a flow chart of a drag reduction method for an aircraft, according to an example of the present disclosure.

FIG. 7 illustrates a flow chart of a drag reduction method for an aircraft, according to an example of the present disclosure. At 300, a first vortex generator is positioned on a portion (such as a vertical stabilizer, a horizontal stabilizer, one or more wings, a fuselage, one or more engines, and/or the like) of an aircraft. At 302, a second vortex generator is positioned on the portion of the aircraft so that the first vortex generator and the second vortex generator are asymmetrical to one another in relation to a common coupling axis. That is, the drag reduction method includes providing a first vortex generator on a portion of the aircraft, providing a second vortex generator that is associated with the first vortex generator on the portion of the aircraft, and forming an asymmetry between the first vortex generator and the second vortex generator in relation to a coupling axis, thereby resulting in a longitudinal offset of the cross-sectional area contribution of the first and second vortex generators.

Figure 8:
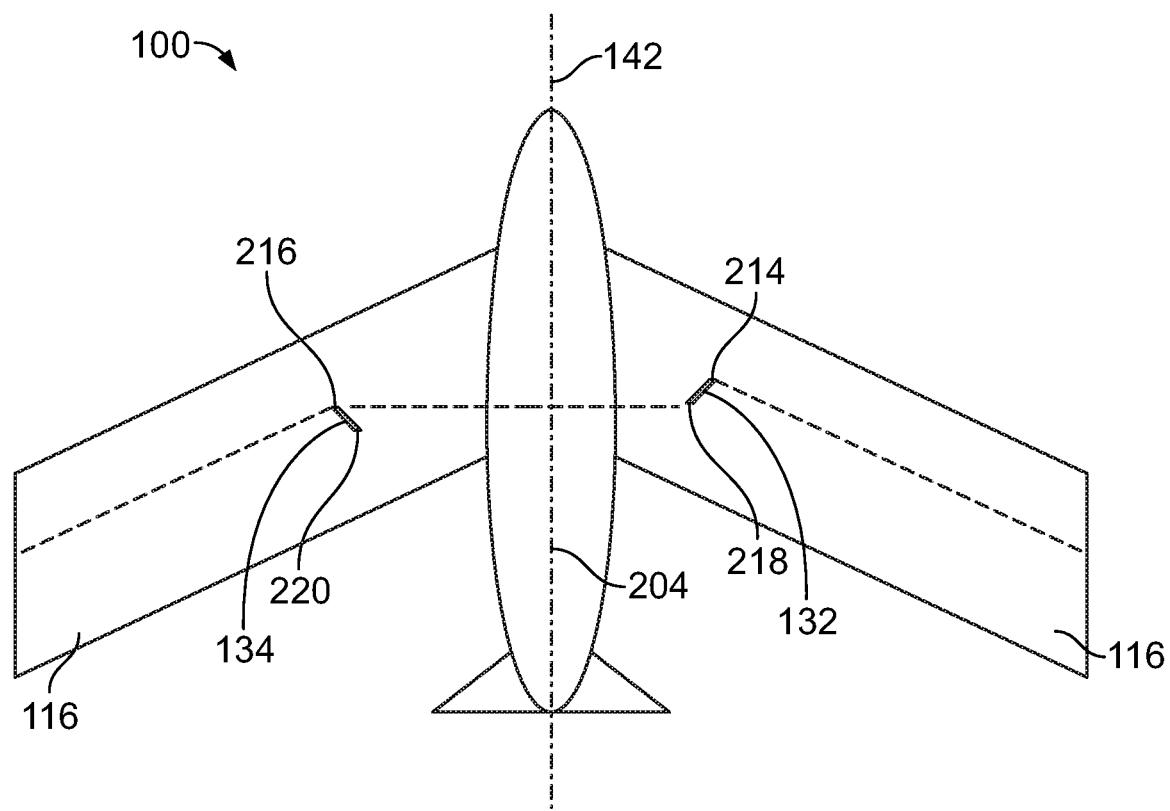
FIG. 8 illustrates a top plan view of an aircraft, according to an example of the present disclosure.

FIG. 8 illustrates a top plan view of an aircraft 100, according to an example of the present disclosure. As shown, the aircraft 100 may have swept wings 116. Alternatively, the wings 116 may be straight. As shown, the second leading edge 216 of the second vortex generator 134 is longitudinally aligned with the first trailing edge 218 of the first vortex generator 132. As such, a cross-section between the first vortex generator 132 and the second vortex generator 134 only has a one unit drop at the second trailing edge 220 of the second vortex generator 134, thereby resulting in low wave drag. As shown, the first vortex generator 132 and the second vortex generator 134 may be at different distances to the coupling axis 204, thereby laterally offsetting the first and second vortex generators 132 and 134.

Certain examples of the present disclosure provide drag reduction systems in which a trailing edge of a fore vortex generator (that is, closer to a fore of an aircraft than an associated aft vortex generator) is longitudinally aligned with a leading edge of an aft vortex generator (that is, closer to an aft of the aircraft than the fore vortex generator). The fore and aft vortex generator may have leading edges at a 40% chord line, and lateral positions where the leading edge of the aft vortex generator (which is at 40% chord) is longitudinally aligned with the trailing edge of the forward vortex generator (which is at more than 40% chord). As such, the vortex generators may be at different lateral distances from the axis. The difference in lateral distance from the axis may have little to no effect on wave drag. Instead, the difference in lateral distance positions both vortex generators at the same percent chord, which may be structurally or aerodynamically desirable.

Referring to FIGS. 1-8, it has been found that the asymmetric relationship between the first vortex generator and the second vortex generator, such as described herein, reduces the drag effect that would otherwise be caused by symmetrical vortex generators. That is, by positioning the first vortex generator 132 and the second vortex generator 134 to be asymmetrical to one another with respect to the coupling axis 204, aerodynamic drag at high speeds is reduced.

As described herein, examples of the present disclosure provide systems and methods of reducing a drag effect of vortex generators on an aircraft. Further, examples of the present disclosure provide efficient, low cost systems and methods of reducing a drag effect of vortex generators.

While various spatial and directional terms, such as top, bottom, lower, mid, lateral, horizontal, vertical, front and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples of the disclosure without departing from their scope. While the dimensions and types of materials described herein are intended to define the parameters of the various examples of the disclosure, the examples are by no means limiting and are exemplary. Many other examples will be apparent to those of skill in the art upon reviewing the above description. The scope of the various examples of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A drag reduction system for an aircraft, the drag reduction system comprising:
   a first vortex generator fixed on a portion of the aircraft, wherein the first vortex generator is static and immovable in relation to the portion of the aircraft; and
   a second vortex generator fixed on the portion of the aircraft, wherein the second vortex generator is static and immovable in relation to the portion of the aircraft, the first vortex generator associated with the second vortex generator, wherein the first vortex generator and the second vortex generator are asymmetrical to one another in relation to a coupling axis, wherein the coupling axis is a center line of the aircraft, and wherein the first and second vortex generators are equidistant from the coupling axis.

2. The drag reduction system of claim 1, wherein the portion of the aircraft comprises a vertical stabilizer.

3. The drag reduction system of claim 2, wherein the first vortex generator extends from one of a port side or a starboard side of the vertical stabilizer, the second vortex generator extends from the other of the port side or the starboard side of the vertical stabilizer, and wherein a root of the vertical stabilizer comprises the coupling axis.

4. The drag reduction system of claim 1, wherein a first angle at which the first vortex generator is oriented in relation to the coupling axis differs from a second angle at which the second vortex generator is oriented in relation to the coupling axis.

5. The drag reduction system of claim 1, wherein a first length of the first vortex generator differs from a second length of the second vortex generator.

6. The drag reduction system of claim 1, wherein the first vortex generator is longitudinally offset from the second vortex generator.

7. The drag reduction system of claim 6, wherein the first vortex generator and the second vortex generator are proximate to a common fuselage station of the aircraft.

8. The drag reduction system of claim 1, wherein a first spanwise distance to the coupling axis of a portion of the first vortex generator differs from a second spanwise distance to the coupling axis of a corresponding portion of the second vortex generator.

9. The drag reduction system of claim 8, wherein a portion of the first vortex generator is further fore or aft than at least a corresponding portion of the second vortex generator.

10. The drag reduction system of claim 1, wherein a leading edge of one of the first vortex generator or the second vortex generator is longitudinally aligned with an intermediate portion of the other of the first vortex generator or the second vortex generator.

11. The drag reduction system of claim 1, wherein an asymmetry between the first vortex generator and the second vortex generator in relation to the coupling axis is formed by two or more of the following:
   a first angle at which the first vortex generator is oriented in relation to the coupling axis differing from a second angle at which the second vortex generator is oriented in relation to the coupling axis,
   a first length of the first vortex generator differing from a second length of the second vortex generator, or
   the first vortex generator being longitudinally offset from the second vortex generator.

12. The drag reduction system of claim 1,
   wherein a first angle at which the first vortex generator is oriented in relation to the coupling axis differs from a second angle at which the second vortex generator is oriented in relation to the coupling axis,
   wherein a first length of the first vortex generator differs from a second length of the second generator vortex, and
   wherein the first vortex generator is longitudinally offset from the second vortex generator.

13. A drag reduction method for an aircraft, the drag reduction method comprising:
   fixing a first vortex generator on a portion of the aircraft, wherein the first vortex generator is static and immovable in relation to the portion of the aircraft;
   fixing a second vortex generator that is associated with the first vortex generator on the portion of the aircraft, wherein the second vortex generator is static and immovable in relation to the portion of the aircraft; and
   forming an asymmetry between the first vortex generator and the second vortex generator in relation to a coupling axis, wherein the coupling axis is a center line of the aircraft, and wherein the first and second vortex generators are equidistant from the coupling axis.

14. The drag reduction method of claim 13, wherein the forming the asymmetry comprises orienting the first vortex generator at a first angle in relation to the coupling axis that differs from a second angle at which the second vortex generator is oriented in relation to the coupling axis.

15. The drag reduction method of claim 13, wherein the forming the asymmetry comprises differing a first length of the first vortex generator from a second length of the second vortex generator.

16. The drag reduction method of claim 13, wherein the forming the asymmetry comprises longitudinally offsetting the first vortex generator from the second vortex generator.

17. The drag reduction method of claim 13, wherein the portion of the aircraft comprises a vertical stabilizer.

18. The drag reduction method of claim 17, wherein the first vortex generator extends from one of a port side or a starboard side of the vertical stabilizer, the second vortex generator extends from the other of the port side or the starboard side of the vertical stabilizer, and wherein a root of the vertical stabilizer comprises the coupling axis.

19. The drag reduction method of claim 13, wherein the first vortex generator and the second vortex generator are proximate to a common fuselage station of the aircraft.

20. The drag reduction method of claim 13, wherein a first spanwise distance to the coupling axis of a portion of the first vortex generator differs from a second spanwise distance to the coupling axis of a corresponding portion of the second vortex generator.

* * * * *